(12) United States Patent
Katsumata

(10) Patent No.: US 9,350,233 B2
(45) Date of Patent: May 24, 2016

(54) VOLTAGE CONVERSION CIRCUIT AND SWITCHING CONTROL CIRCUIT

(71) Applicant: Kabushiki Kaisha Toshiba, Tokyo (JP)

(72) Inventor: Maomi Katsumata, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 319 days.

(21) Appl. No.: 13/973,815

(22) Filed: Aug. 22, 2013

(65) Prior Publication Data

US 2014/0285171 A1 Sep. 25, 2014

(30) Foreign Application Priority Data

Mar. 22, 2013 (JP) ................. 2013-059868

(51) Int. Cl.
*H02M 1/00* (2007.01)
*H02M 3/07* (2006.01)

(52) U.S. Cl.
CPC .......... *H02M 3/07* (2013.01); *H02M 2003/072* (2013.01); *H02M 2003/075* (2013.01)

(58) Field of Classification Search
CPC . H02M 3/07; H02M 3/156; H02M 2003/075; H02M 2003/072
See application file for complete search history.

(56) References Cited

U.S. PATENT DOCUMENTS

| | | | |
|---|---|---|---|
| 5,499,183 A | 3/1996 | Kobatake | |
| 5,889,427 A | 3/1999 | Nakajima | |
| 5,956,243 A * | 9/1999 | Mao | H02M 1/4208 363/143 |
| 5,969,565 A | 10/1999 | Naganawa | |
| 6,157,242 A | 12/2000 | Fukui | |
| 6,567,309 B2 | 5/2003 | Tanzawa | |
| 7,016,231 B2 | 3/2006 | Kubo | |
| 7,099,166 B2 * | 8/2006 | Kim | H02M 3/07 327/536 |
| 7,847,488 B2 | 12/2010 | Kojima | |
| 2004/0190361 A1 | 9/2004 | Tokui et al. | |
| 2006/0114053 A1 | 6/2006 | Sohara et al. | |
| 2008/0238536 A1 | 10/2008 | Hayashi et al. | |
| 2010/0225286 A1 * | 9/2010 | Osaka | H02M 3/1584 323/272 |

(Continued)

FOREIGN PATENT DOCUMENTS

| | | |
|---|---|---|
| CN | 1835366 A | 9/2006 |
| CN | 101873065 A | 10/2010 |
| CN | 102684500 A | 9/2012 |

(Continued)

OTHER PUBLICATIONS

Japanese Office Action dated Jun. 19, 2015, filed in Japanese counterpart Application No. 2013-059868, 9 pages (with translation).

(Continued)

*Primary Examiner* — Matthew Nguyen
(74) *Attorney, Agent, or Firm* — Patterson & Sheridan, LLP

(57) ABSTRACT

In an embodiment, a voltage conversion circuit includes a first voltage conversion unit stepping up or stepping down an input DC voltage and a second voltage conversion unit stepping up or stepping down an input DC voltage. A switcher is configured to switch between using both the first and second conversion units or just one of the first and second conversion units. The switcher can optionally be controlled according to an input voltage level such that both the first and second voltage conversion units can be used for a voltage step-up or voltage step-down operation or just one of the first and second voltage conversion units can be used.

16 Claims, 12 Drawing Sheets

(56) References Cited

U.S. PATENT DOCUMENTS

| | | | | |
|---|---|---|---|---|
| 2014/0265605 A1* | 9/2014 | Ishigaki | ................ | H02M 3/158 307/80 |
| 2014/0271272 A1* | 9/2014 | Jeon | ........................ | H02M 7/06 417/410.1 |

FOREIGN PATENT DOCUMENTS

| | | | |
|---|---|---|---|
| JP | H02179264 | A | 7/1990 |
| JP | H04322158 | A | 11/1992 |
| JP | 07-154962 | | 6/1995 |
| JP | H11273379 | A | 10/1999 |
| JP | 3157812 | B2 | 4/2001 |
| JP | 2002233139 | A | 8/2002 |
| JP | 2003088103 | A | 3/2003 |
| JP | 3487581 | B2 | 1/2004 |
| JP | 3609268 | B2 | 1/2005 |
| JP | 2006158132 | A | 6/2006 |
| JP | 2007188612 | A | 7/2007 |
| JP | 2007336722 | A | 12/2007 |
| JP | 4328084 | B2 | 9/2009 |
| JP | 4412940 | B2 | 2/2010 |
| JP | 4694410 | B2 | 6/2011 |

OTHER PUBLICATIONS

Chinese Office Action dated Jan. 21, 2016, filed in Chinese counterpart Application No. 201310409293.4, 22 pages (with translation).
Japanese Office Action dated Feb. 16, 2016, filed in Japanese counterpart Application No. 2013-059868, 6 pages (with translation).

* cited by examiner

US 9,350,233 B2

VOLTAGE CONVERSION CIRCUIT AND SWITCHING CONTROL CIRCUIT

CROSS-REFERENCE TO RELATED APPLICATION

This application is based upon and claims the benefit of priority from Japanese Patent Application No. 2013-059868, filed Mar. 22, 2013, the entire contents of which are incorporated herein by reference.

FIELD

Embodiments described herein relate generally to a voltage conversion circuit which steps up or steps down an input voltage.

BACKGROUND

In general, a voltage step-up circuit generates an output voltage with a desired voltage level by stepping up an input voltage. For example, this type of voltage step-up circuit is a circuit in which diode-connected transistors are serially connected to one another, and a capacitor is connected between each of the transistors, respectively.

According to such a circuit configuration, a voltage is stepped up stepwise in units of the voltage obtained by subtracting a threshold voltage of the transistor from the input voltage. Even if the number of connection steps of the transistor is increased, the threshold voltage of the transistor is subtracted from the input voltage for each of the connection steps. Therefore, in order to obtain the output voltage with a high voltage level, there is a possibility that the number of steps of the voltage step-up circuit may have to be increased by is so much that the internal voltage of the device will exceed a voltage breakdown limit of the voltage step-up circuit. In addition, as the number of the connection steps is increased, the current consumption is increased, thus causing a disadvantage in terms of the power consumption and power efficiency.

It has also been proposed to change the above-described circuit configuration to a voltage step-up circuit system that does not lead to a loss equivalent to the threshold voltage of the transistor with each step. However, although such a voltage step-up circuit in general has an excellent voltage step-up capability, the operation speed may be slow or the power consumption may be even higher.

DETAILED DESCRIPTION

In an exemplary embodiment described herein, there is provided a voltage conversion circuit which can quickly step up or step down an input voltage to a desired output voltage without increasing the power consumption.

In general, according to one embodiment, a voltage conversion circuit includes a first voltage conversion configured to receive a direct current (DC) voltage of a first level and to output a DC voltage of a second level by stepping up or stepping down the DC voltage of the first level. The voltage conversion circuit includes a second voltage conversion unit configured to receive a DC voltage of a third level and to output a DC voltage of a fourth level by stepping up or stepping down the DC voltage of the third level. A switcher is configured to switch between using one of the first and second voltage conversion units to generate an output voltage and using both of the first and second voltage conversion units to generate an output voltage.

Hereinafter, embodiments will be described with reference to the accompanying drawings.

(First Embodiment)

Figure 1:
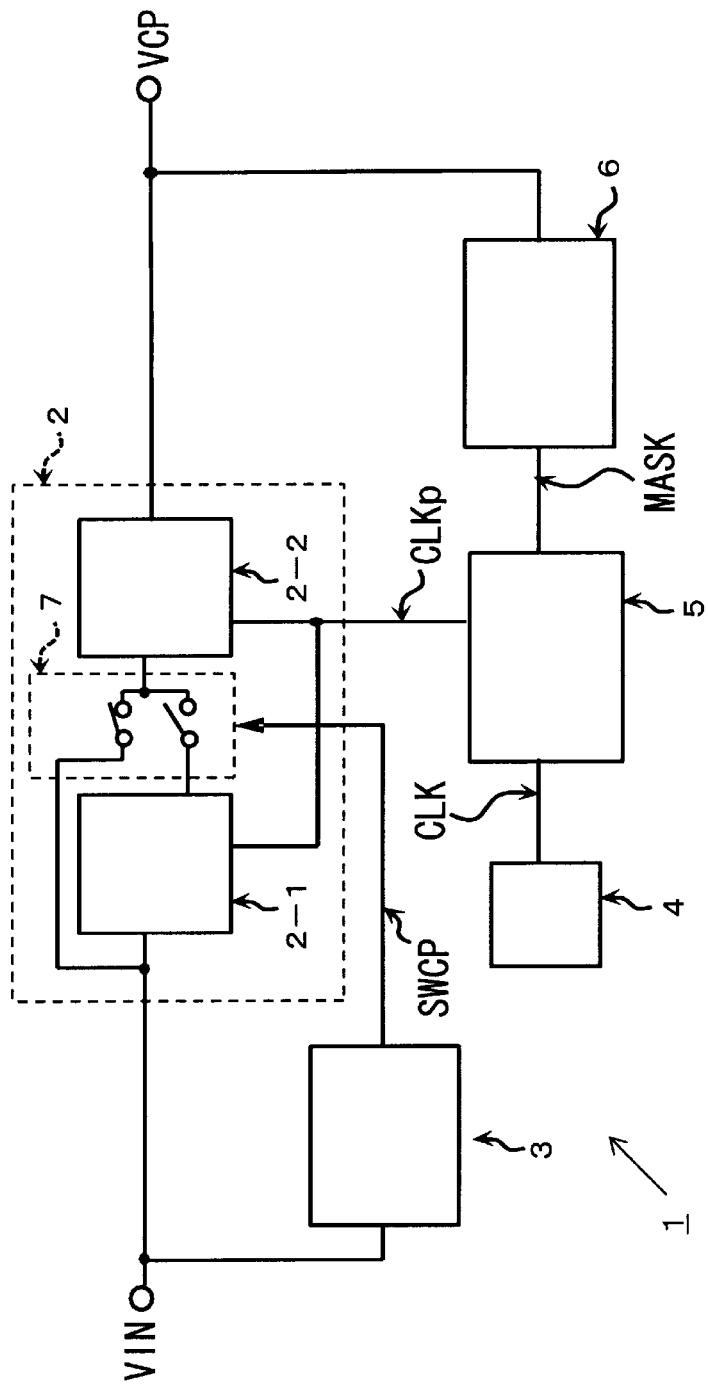
FIG. 1 is a block diagram illustrating a schematic configuration of a voltage conversion circuit according to a first embodiment.

FIG. 1 is a block diagram illustrating a schematic configuration of a voltage conversion circuit 1 according to a first embodiment. The voltage conversion circuit 1 in FIG. 1 is a voltage step-up circuit stepping up an input voltage VIN.

The voltage conversion circuit 1 in FIG. 1 includes a voltage step-up unit 2, an input voltage detection circuit 3, an oscillation circuit 4, a clock control circuit 5 and an output voltage detection circuit 6. The voltage step-up unit 2 further has a first voltage step-up unit 2-1, a second voltage step-up unit 2-2 and a switcher 7.

The first voltage step-up unit 2-1 steps up the input voltage VIN to generate a first step-up voltage. The switcher 7 is connected to between the first voltage step-up unit 2-1 and the second voltage step-up unit 2-2. The switcher 7, depending on a voltage level of the input voltage VIN, switches between using both of the first voltage step-up unit 2-1 and the second voltage step-up unit 2-2 to step up the input voltage VIN, or using the second voltage step-up unit 2-2 only to step up the input voltage VIN.

The switcher 7 may also be configured to switch whether to step up the input voltage VIN using both of the first voltage step-up unit 2-1 and the second voltage step-up unit 2-2, or to step up the input voltage VIN using the first voltage step-up unit 2-1 only. In this case, an internal wiring route in the voltage step-up unit 2 is not as specifically depicted in FIG. 1, but would rather allow the output of first voltage step-up unit 2-1 to bypass the second voltage step-up unit 2-2.

The input voltage detection circuit 3 compares the input voltage VIN and a predetermined reference voltage level. A hysteresis (a difference between the reference level used for on and off determinations) is used for the comparison of the input voltage VIN and the predetermined reference voltage. That is, the predetermined reference voltage level is different for the purposes of controlling the switching of the switcher 7 based on the comparison result. The reason for having the hysteresis applied in the comparison is to prevent too frequent the switching due to the influence of noise in the input voltage.

The first voltage step-up unit 2-1 and the second voltage step-up unit 2-2 perform a voltage step-up operation in synchronization with a clock signal generated by the clock control circuit 5. The clock control circuit 5 generates the clock signal based on an oscillation signal output from the oscillation circuit 4.

The output voltage detection circuit 6 monitors an output voltage VCP of the voltage step-up unit 2 and supplies the clock control circuit 5 with a mask signal MASK indicating a result of comparison of the output voltage VCP to a predetermined upper limit voltage Vhigh and lower limit voltage Vlow. The clock control circuit 5 switches whether or not to supply the clock signal to the voltage step-up unit 2 based on the mask signal MASK output from the output voltage detection circuit 6. A voltage width Vhys is a difference between the upper limit voltage Vhigh and the lower limit voltage Vlow and is equivalent to a hysteresis portion. In this manner, the output voltage detection circuit 6 monitors the output voltage VCP and control of the voltage step-up unit 2 is performed with a hysteresis being applied as explained below.

Figure 2:
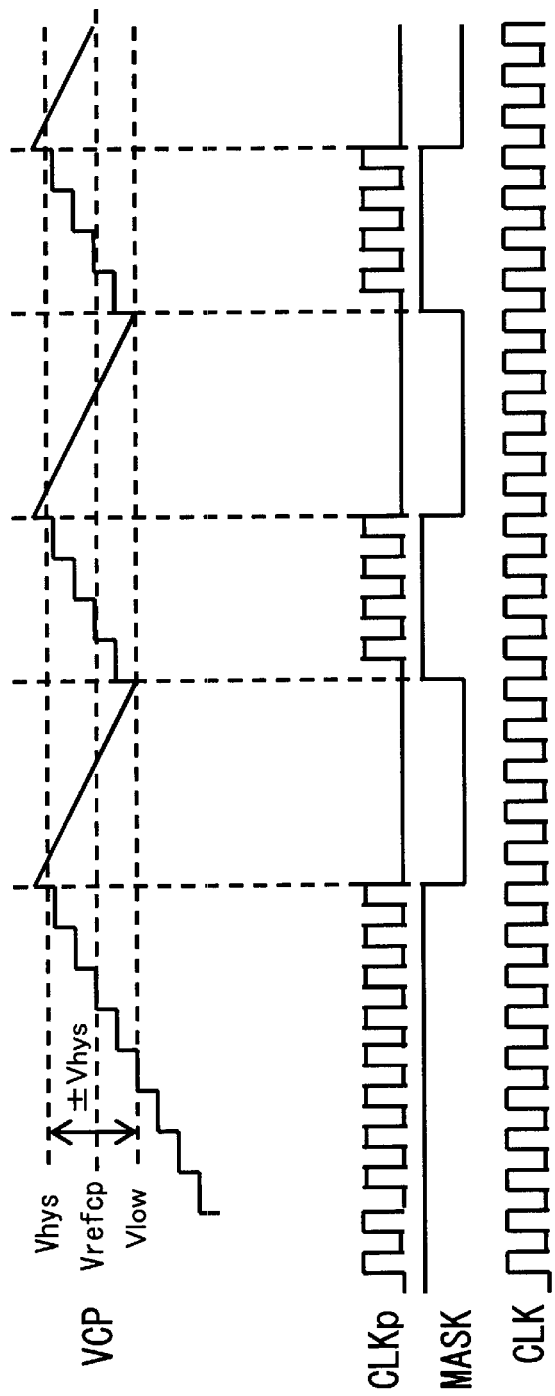
FIG. 2 is a signal waveform diagram of an output voltage of a voltage step-up unit, a clock signal output from a clock control circuit, a mask signal and an oscillation signal output from an oscillation circuit.

The control of the voltage step-up unit with a hysteresis being applied is depicted in FIG. 2 as a signal waveform diagram of the output voltage VCP of the voltage step-up unit 2, the clock signal CLKp output from the clock control circuit 5, the mask signal MASK and the oscillation signal CLK output from the oscillation circuit 4. As illustrated in FIG. 2, if the output voltage VCP of the voltage step-up unit 2 is equal to the upper limit voltage Vhigh or higher, the mask signal MASK is in a low level. When mask signal MASK is a low level, the step-up operation of voltage step-up unit 2 is stopped and the output voltage VCP will gradually decrease. The mask signal MASK is not switched to a high level until the output voltage VCP is equal to or lower than lower limit voltage Vlow. When mask signal MASK is at the high level, then the step-up operation of voltage step-up unit 2 resumes.

During a period when the mask signal MASK is in the low level, the clock control circuit 5 stops supplying the clock signal CLKp to the voltage step-up unit 2. The first voltage step-up unit 2-1 and the second voltage step-up unit 2-2 inside the voltage step-up unit 2 perform the voltage step-up operation in synchronization with the clock signal CLKp, and thus do not perform the voltage step-up operation during a period when the clock signal CLKp is not supplied. Accordingly, the output voltage VCP is gradually decreased during the period.

In this manner, the first voltage step-up unit 2-1 and the second voltage step-up unit 2-2 intermittently perform the voltage step-up operation using a feedback control of the output voltage detection circuit 6 so as to render the output voltage VCP at an approximately constant level.

The voltage step-up unit 2 of the embodiment performs the voltage step-up operation using both the first voltage step-up unit 2-1 and the second voltage step-up unit 2-2 when the input voltage VIN is below some predetermined voltage level (e.g., reference voltage Vrefin or reference voltage Vrefin less some predetermined voltage amount), and performs the voltage step-up operation using only the second voltage step-up unit 2-2 if the input voltage VIN is above some predetermined voltage level (e.g., reference voltage Vrefin or reference voltage Vrefin plus some predetermined voltage amount). The predetermined voltage level can be set based on, for example, differences between nominal input voltage levels and the desired output voltage levels and/or preferences regarding power consumption, voltage output stability, and the like. Accordingly, if the input voltage Vin is initially well below the predetermined voltage level, it is possible to quickly set the output voltage VCP to a desired voltage. In addition, if a voltage difference between the input voltage VIN and the output voltage VCP is small, only the second voltage step-up unit 2-2 performs the voltage step-up operation without performing any excessive voltage step-up operation, which can reduce the power consumption.

Figure 3:
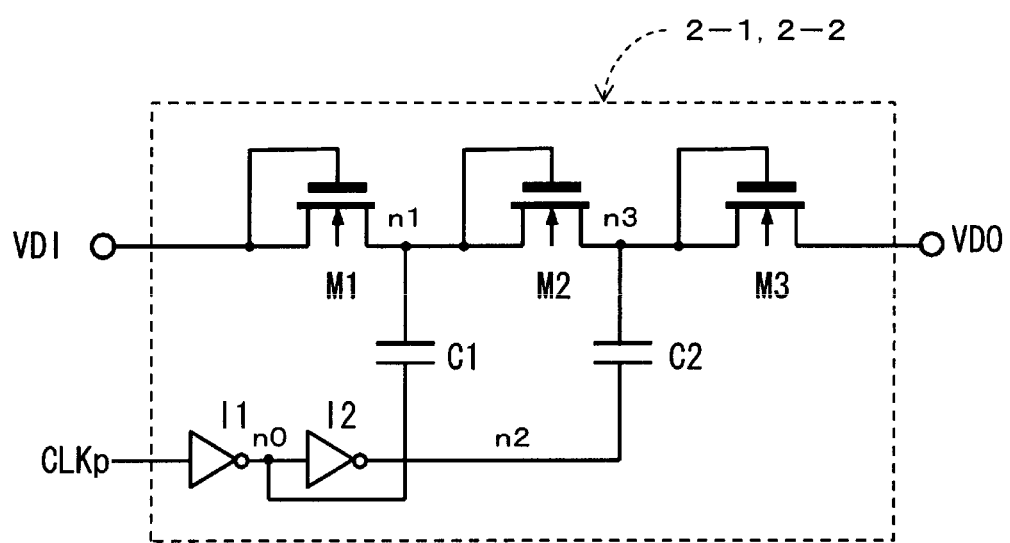
FIG. 3 is a circuit diagram illustrating an example of an internal configuration of a first voltage step-up unit and a second voltage step-up unit.

FIG. 3 is a circuit diagram illustrating an example of an internal configuration of the first voltage step-up unit 2-1 and the second voltage step-up unit 2-2. The circuit in FIG. 3 employs a voltage step-up circuit system which is referred to as a "Dickson type." The circuit in FIG. 3 is configured such that three transistors M1, M2 and M3 are serially connected between an input node to which the input voltage VIN is input and an output node to which the output voltage VCP is output, and capacitors C1 and C2 are each respectively connected to a connection node between the two adjacent transistors (i.e., n1 between transistors M1 and M2 and n3 between transistors M2 and M3). An inverted signal of the clock signal CLK is input, in this example, to the other side (the side not connected to the connection node) of capacitor C1. A signal with the same logic signal as the clock signal is input to the other side of capacitor C2. In some embodiments, the signals input to the other side of the capacitors C1 and C2 may be switched.

In this manner, if signals having the mutually inverted logic is input to the other side of the capacitors C1 and C2, the voltage step-up operation is performed each time the signal passes through the transistors M1 to M3 serially connected from the input side to the output side.

For example, when the voltage of the other side node n0 of the capacitor C1 is in the low level, an electric charge is stored in the capacitor C1 corresponding to a voltage lower than the input voltage VIN by the threshold voltage of the transistor M1. Then, if the clock signal CLK is inverted, the voltage of the other side node n0 of the capacitor C1 is in the high level and node n1 is also raised by the high level voltage portion of the other side of capacitor C1. At this time, the other end side node n2 of the capacitor C2 is in the low level. Accordingly, the electric charge is stored in the capacitor C2 corresponding to a voltage lower than the one end side voltage of the capacitor C1 by the threshold voltage of the transistor M2. Then, if the clock signal CLK is inverted, the voltage of the node n0 of the capacitor C1 is in the low level and node n2 of the capacitor C2 is in the high level. Accordingly, node n3 of the capacitor C2 is raised by the high level voltage portion of the other end side.

According to the above-described operation, the voltage step-up operation is performed in synchronization with a cycle of the clock signal CLK. This assumes that the high level voltage of the clock signal CLK is the same as the input voltage VIN, and if the threshold voltage of the transistors M1 to M3 is set to VTH, the voltage of the connection node n1 of the transistors M1 and M2 becomes (VIN−VTH), the voltage of the connection node n3 of the transistors M2 and M3 becomes 2×(VIN−VTH), and an output voltage VDO of the circuit in FIG. 3 becomes 3×(VIN−VTH).

The circuit in FIG. 3 is described by way of an example where the respective transistors M1 to M3 are diode-connected to one another. However, the respective transistors are not necessarily diode-connected to one another. In this case, if a forward direction voltage of the respective transistors is set to VF, the output voltage VDO of the circuit in FIG. 3 becomes 3×(VIN−VF).

The circuit in FIG. 3 is applicable to both of the first voltage step-up unit 2-1 and the second voltage step-up unit 2-2. However, if the number of steps of the transistor is increased more than the circuit in FIG. 3, it is possible to further enhance the voltage step-up capability. In this manner, the number of steps of the transistor maybe different from each other in the first voltage step-up unit 2-1 and the second voltage step-up unit 2-2. The first voltage step-up unit 2-1 performs the voltage step-up operation when the voltage level of the input voltage VIN is low relative to some predetermined voltage level. Therefore, in order to quickly perform the voltage step-up operation, the number of steps in the first voltage step-up unit 2-1 may be more than the number of steps in the second voltage step-up unit 2-2.

When serially connecting the circuit in FIG. 3, which is a unit configuration of the voltage step-up unit, as many transistors as required for the desired step up operation may be included (that is, M1 and M2 may be repeatedly included as needed).

Figure 4:
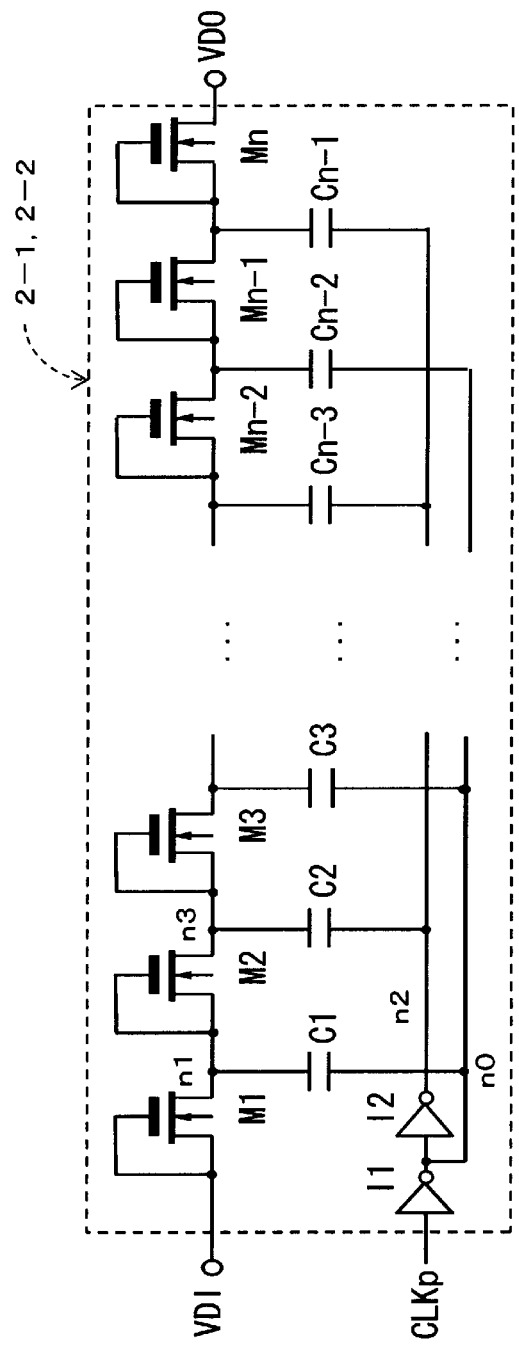
FIG. 4 is a circuit diagram in which the number of steps of a transistor is increased more than that of the circuit in FIG. 3.

FIG. 4 is a circuit diagram where the number of steps of the transistor is increased to more than the circuit in FIG. 3. FIG. 4 illustrates an example where a plurality of the transistors M1 and M2 in FIG. 3 are serially connected to one another. The transistor labeled "M3" in FIG. 4 corresponds to a repeated transistor M1 of the second circuit in the array of serially connected transistors depicted in FIG. 4.

Total n number (n is an odd number of three or more) of transistors M1 to Mn is serially connected to the circuit in FIG. 4, and the capacitors C1 to Cn−1 are connected to the connection nodes of the respective transistors. The inverted clock signal CLK is input to odd numbered capacitors and a signal having the same logic signal as the clock signal is input to the even numbered capacitors.

The circuit in FIG. 4 is applicable to both of the first voltage step-up unit 2-1 and the second voltage step-up unit 2-2. As described above, the number of connection steps of the transistor may be different from each other in the first voltage step-up unit 2-1 and the second voltage step-up unit 2-2. For example, if the connection steps of the transistor in the first voltage step-up unit 2-1 is n and the connection steps of the transistor in the second voltage step-up unit 2-2 is m, the voltage step-up capability becomes (n+m)×(VIN−VTH) or (n+m)×(VIN−VF) when both of the voltage step-up units 2 perform the voltage step-up operation. In addition, the voltage step-up capability becomes m×(VIN−VTH) or m×(VIN−VF) when the input voltage VIN is higher than a predetermined reference level and only the second voltage step-up units 2-2 steps up the voltage.

In this manner, in the first embodiment, the voltage step-up unit 2 is configured to include the first voltage step-up unit 2-1, the second voltage step-up unit 2-2 and the switcher 7. The switcher 7, depending on the voltage level of the input voltage VIN relative to the predetermined reference level, switches whether to perform the voltage step-up operation using both of the first voltage step-up unit 2-1 and the second voltage step-up unit 2-2, or to perform the voltage step-up operation using the second voltage step-up unit 2-2 only. Therefore, it is possible to reduce the electric current consumption and perform the voltage step-up operation by quickly performing the voltage step-up operation using both of the first voltage step-up unit 2-1 and the second voltage step-up unit 2-2, when the input voltage VIN is low relative to the predetermined reference level, and using the second voltage step-up unit 2-2 only, when the input voltage VIN becomes high relative to the predetermined reference level.

As will be described, the voltage conversion circuit 1 in FIG. 1 may be configured such that the input voltage VIN is stepped down instead of being stepped up. In addition, a switch or the like may switch between operating modes which step up or step down the input voltage VIN. Therefore, the voltage conversion circuit 1 in FIG. 1 may include at least a first voltage conversion unit corresponding to the first voltage step-up unit 2-1, a second voltage conversion unit corresponding to the second voltage step-up unit 2-2 and the switcher 7. The first voltage conversion unit and the second voltage conversion unit step up or step down the input DC voltage. The switcher 7, depending on the voltage level of the input voltage VIN, switches whether to use both of the first voltage conversion unit and the second voltage conversion unit for the voltage step-up or step-down operation, or to use any one of the first voltage conversion unit and the second voltage conversion unit for the voltage step-up or step-down operation.

(Second Embodiment)

In a second embodiment described below, the first voltage step-up unit 2-1 and the second voltage step-up unit 2-2 are configured to have a different circuit configuration from those of the first embodiment.

Figure 5:
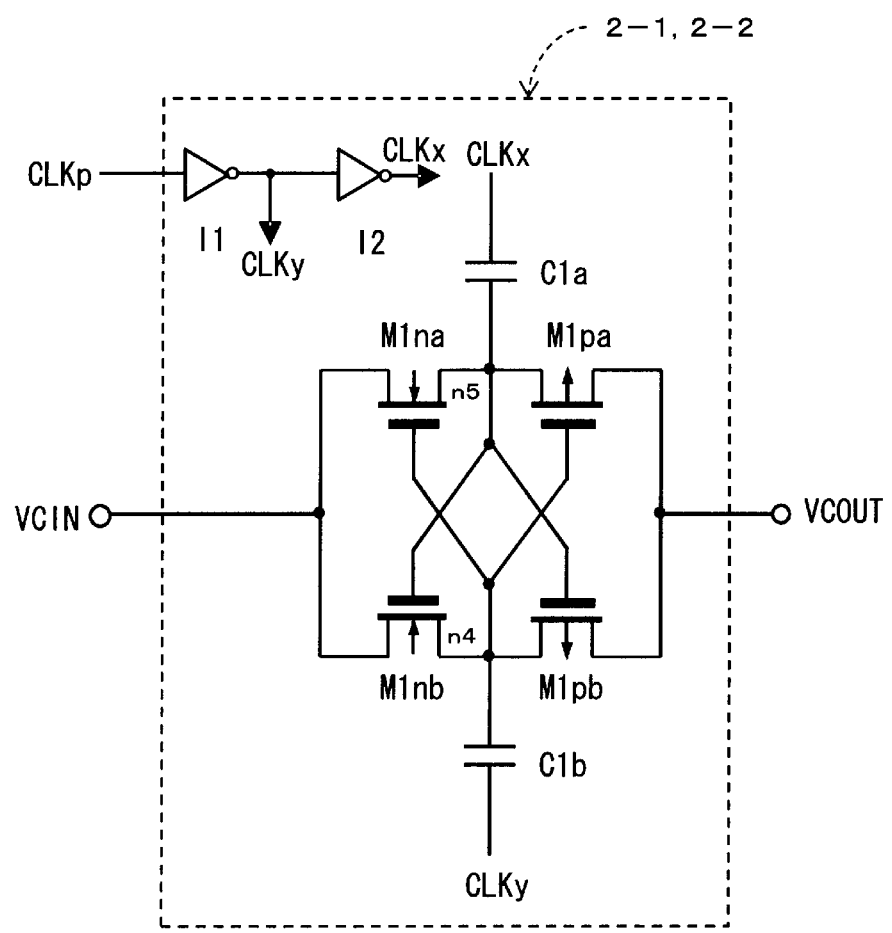
FIG. 5 is a circuit diagram illustrating a unit circuit configuration of a voltage step-up unit, a so-called cross-coupled type, which is applicable to both the first voltage step-up unit and the second voltage step-up unit.

FIG. 5 is a circuit diagram illustrating a unit circuit configuration of a voltage step-up unit 2, a so-called cross-coupled type, which is applicable to both of the first voltage step-up unit 2-1 and the second voltage step-up unit 2-2. The circuit in FIG. 5 has NMOS transistors M1na and M1nb, PMOS transistors M1pa and M1pb and capacitors C1a and C1b.

The NMOS transistor M1na and PMOS transistor M1pa are serially connected to between an input node VCIN and an output node VCOUT. A gate of the transistors and one end of the capacitor C1b are connected to each other in common (at node n4) and an inversion signal CLKy of the clock signal CLK is supplied to the other end of the capacitor C1b.

The NMOS transistor M1nb and the PMOS transistor M1pb are serially connected to between the input node VCIN and the output node VCOUT. The gate of the transistors and the one end of the capacitor C1a are connected to each other in common (at node n5) and the same logic signal CLKx of the clock signal CLK is supplied to the other end of the capacitor C1a.

For example, when the clock signal CLKx is in the low level, the clock signal CLKy is in the high level. If the clock signal CLKy is in the high level, the voltage of node n4 is raised, the NMOS transistor M1na is turned on and the PMOS transistor M1pa is turned off. In this manner, the voltage of the input node VCIN causes the electric charge to be stored in the capacitor C1a.

At this time, the clock signal CLKx is in the low level, the electric potential of node n5 is lowered, the NMOS transistor M1nb is turned off and the PMOS transistor M1pb is turned on. In this manner, the voltage of node n1 is output to the output node VCOUT.

Thereafter, if the logic of the clock signal CLK is inverted, the clock signal CLKx is in the high level and the clock signal CLKy is in the low level. In this manner, the voltage of node n5 is raised, the NMOS transistor M1nb is turned on and the PMOS transistor M1pb is turned off. In addition, the voltage of the node n4 is lowered, the NMOS transistor M1na is turned off and the PMOS transistor M1pa is turned on. In this manner, the voltage of node n5 is output to the output node VCOUT.

Thus, in the circuit in FIG. 5, if the voltage level of the input voltage VCIN is the same as the high level voltage of the clock signal CLK, it is possible to output a voltage that is twice the level of the input voltage VCIN. Since there is no voltage drop due to the forward direction voltage VF of the transistor such as the circuit in FIG. 3 or the threshold voltage VTH, it is possible to further enhance the voltage step-up capability.

Therefore, when the voltage level of the input voltage VIN is in the low level relative to some predetermined reference level, if the voltage step-up operation is performed using the circuit in FIG. 5 rather than the circuit in FIG. 3, it is possible to quickly raise the voltage level of the output voltage. Accordingly, the first voltage step-up unit 2-1 may be configured to have the circuit in FIG. 5. On the other hand, if the difference between the voltage level of the input voltage VIN and a desired output voltage level is small, since the high voltage step-up capability is not required, the second voltage step-up unit 2-2 may be configured to have the circuit in FIG. 3, which is more easily designed. Accordingly, it is the second voltage step-up unit 2-2 is configured to have the circuit in FIG. 3 in some embodiments.

Figure 6:
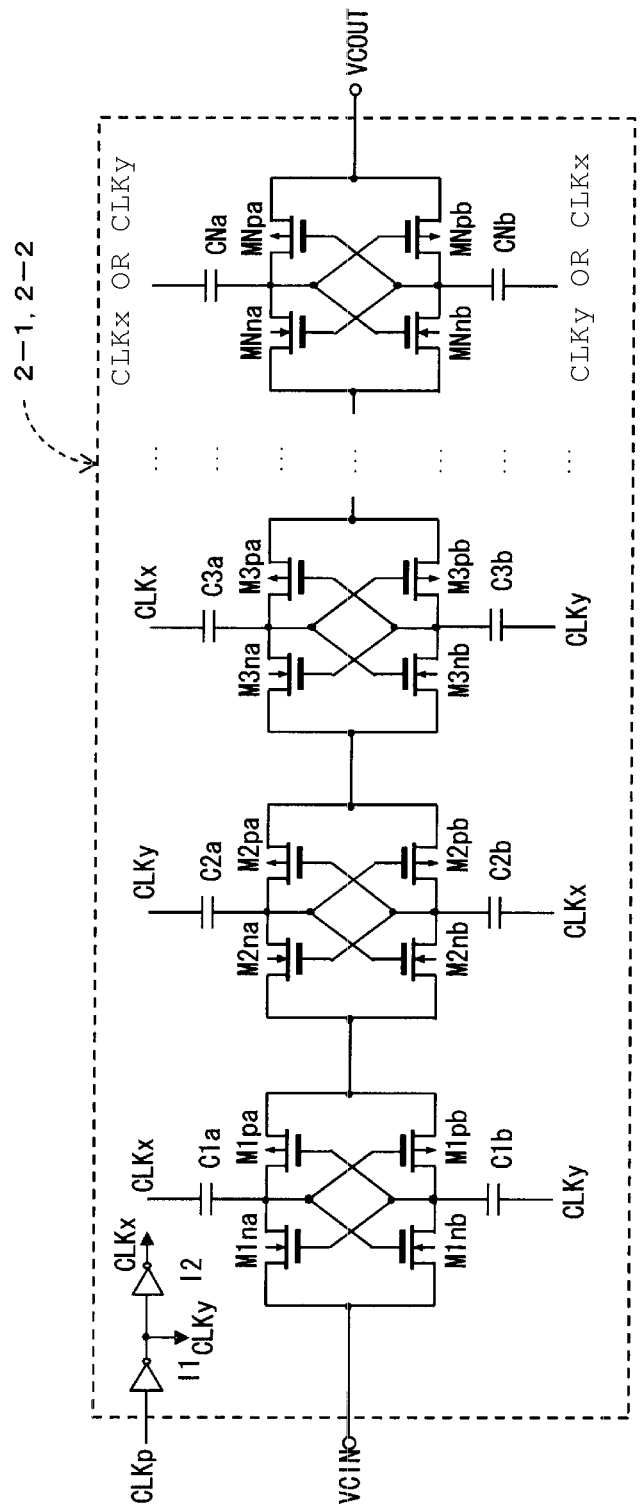
FIG. 6 is a block diagram illustrating an example in which the n number of the circuits in FIG. 5 is serially connected to one another.

If a plurality of the circuits depicted in FIG. 5 is serially connected to one another, it is possible to adjust the voltage step-up capability. FIG. 6 illustrates the circuit in which the n number (where n is an integer of one or more) of the circuits in FIG. 5 are serially connected to one another. Both of the first voltage step-up unit 2-1 and the second voltage step-up unit 2-2 can be configured to have the circuit depicted in FIG. 6, but may have mutually different numbers of steps. For example, if the first voltage step-up unit 2-1 has n steps (n is the integer of one or more) and the second voltage step-up unit 2-2 has m steps (m is the integer of one or more) m is not required to equal n. If both of the first voltage step-up unit 2-1 the second voltage step-up unit 2-2 perform the voltage step-up operation, the voltage step-up capability becomes (n+m+1)×VIN. If the voltage level of the input voltage VIN is high relative to some predetermined reference level and therefore only the second voltage step-up unit 2-2 performs the voltage step-up operation, the voltage step-up capability becomes (m+1)×VIN.

In this manner, in the second embodiment, at least one of the first voltage step-up unit 2-1 and the second voltage step-up unit 2-2 is configured to have a cross-coupled type of circuit system which has the higher voltage step-up capability than the Dickson type. Thus, it is possible to efficiently step up the input voltage VIN using fewer steps. In addition, if the switcher 7 is provided similarly to the first embodiment, the voltage step-up capability can be stepped up depending on the voltage level of the input voltage VIN, which enables both the quick voltage step-up operation using both voltage step-up units and reduced power consumption by using only a single voltage step-unit when VIN is close to the desired output voltage level.

(Third Embodiment)

A third embodiment to be described below may be provided in combination with the first or second embodiments.

Figure 7:
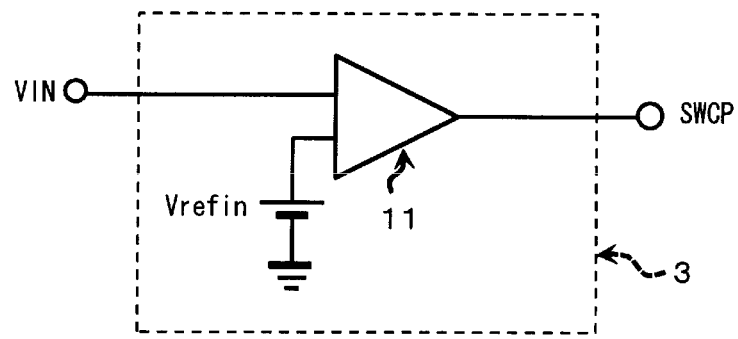
FIG. 7 is a circuit diagram illustrating an example of an internal configuration of an input voltage detection circuit described in the first embodiment and a second embodiment.

FIG. 7 is a circuit diagram illustrating an example of an internal configuration of the input voltage detection circuit 3 described in the first embodiment and the second embodiment. The input voltage detection circuit 3 in FIG. 7 has a comparator 11 which compares the input voltage VIN with a reference voltage Vrefin and outputs a signal SWCP indicating the comparison result. In the signal SWCP output from the comparator 11, the signal logic is changed according to a case where the input voltage VIN is higher than the reference voltage Vrefin or a case where the input voltage VIN is lower than the reference voltage Vrefin. For example, the signal SWCP is in the high level if the input voltage VIN is higher than the reference voltage Vrefin, and is in the low level if the input voltage VIN is equal to or lower than the reference voltage Vrefin.

The output signal SWCP of the input voltage detection circuit 3 is used for controlling the switcher 7. For example, the switcher 7 performs the switching operation such that only the second voltage step-up unit 2-2 performs the voltage step-up operation when the output signal SWCP is in the high level and performs the switching operation such that both of the first voltage step-up unit 2-1 and the second voltage step-up unit 2-2 perform the voltage step-up operation when the output signal SWCP is in the low level.

In addition, the input voltage detection circuit 3 switches the logic of the output signal SWCP with a hysteresis being applied. For example, if the input voltage VIN becomes higher than the reference voltage Vrefin and the output signal SWCP is changed into the high level, then if the input voltage VIN does not become lower than the reference voltage Vrefin by a predetermined voltage Vhys2, the input voltage detection circuit 3 does not switch the output signal SWCP into the low level. In this manner, even if the voltage level of the input voltage VIN finely fluctuates due to noises or the like, the signal logic of the output signal SWCP does not have to be frequently switched in response and thereby noise tolerance is enhanced.

Figure 8:
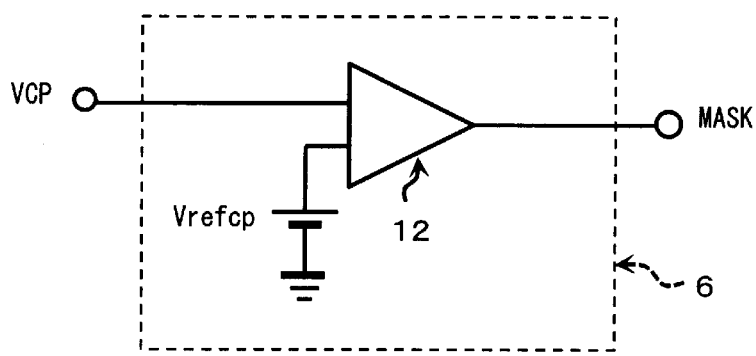
FIG. 8 is a circuit diagram illustrating an example of an internal configuration of an output voltage detection circuit described in the first and second embodiments.

FIG. 8 is a circuit diagram illustrating an example of an internal configuration of the output voltage detection circuit 6 described in the first and second embodiments. The output voltage detection circuit 6 in FIG. 8 has a comparator 12 which compares the output voltage VCP of the voltage step-up unit 2 with a reference voltage Vrefcp and outputs a signal MASK indicating the comparison result. In the signal MASK output from the comparator 12, the signal logic that changes value according to a case where the output voltage VCP is higher than the reference voltage Vrefcp and a case where the output voltage VCP is lower than the reference voltage Vrefcp. For example, the signal MASK is in the low level if the output voltage VCP is higher than the reference voltage Vrefcp, and is in the high level if the output voltage VCP is equal to or lower than the reference voltage Vrefcp.

The output signal MASK of the output voltage detection circuit 6 is input to the clock control circuit 5 to be used for determining whether or not to supply the clock signal to the voltage step-up unit 2. That is, as illustrated in FIG. 2, if the signal MASK is in the low level, the supply of the clock signal to the voltage step-up unit 2 is stopped and the voltage step-up unit 2 does not perform the voltage step-up operation. This results in the gradual decrease in the output voltage VCP.

The output voltage detection circuit 6 generates a signal MASK with a hysteresis being applied. For example, when the output voltage VCP is higher than the reference voltage Vrefcp, the signal MASK is in a low level, and then when the output voltage VCP is lower than the reference voltage Vrefcp by the voltage Vhys, or lower, the signal MASK is in a high level. Accordingly, even if a voltage level of the output voltage VCP fluctuates due to noises or the like, the signal logic of the signal MASK is not frequently switched, and thereby an operation of the voltage step-up unit 2 is stabilized.

Figure 9:
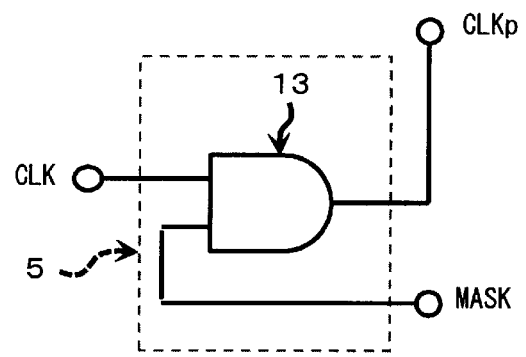
FIG. 9 is a circuit diagram illustrating an example of an internal configuration of the clock control circuit described in the first and second embodiments.

FIG. 9 is a circuit diagram illustrating an example of an internal configuration of the clock control circuit 5 described in the first and second embodiments. The clock control circuit 5 in FIG. 9 includes an AND gate 13. The AND gate 13 generates a clock signal CLK output from the output of the oscillation circuit 4 and a logical conjugation of the signal MASK. That is, the AND gate 13 outputs a clock signal CLK during a period when the signal MASK is in a high level, and stops outputting the clock signal CLK when the signal MASK is in a low level.

In this manner, by providing the input voltage detection circuit 3, it is possible to switch on or off a voltage step-up capability of the voltage step-up unit 2 depending on a voltage level of the input voltage VIN. In addition, by providing the output voltage detection circuit 6 and the clock control circuit 5, it is possible to control whether to supply a clock signal to the voltage step-up unit 2 so that the output voltage VCP of the voltage step-up unit 2 may be constant.

(Fourth Embodiment)

In a fourth embodiment to be described below, the number of connection steps of the voltage step-up unit 2 is increased.

Figure 10:
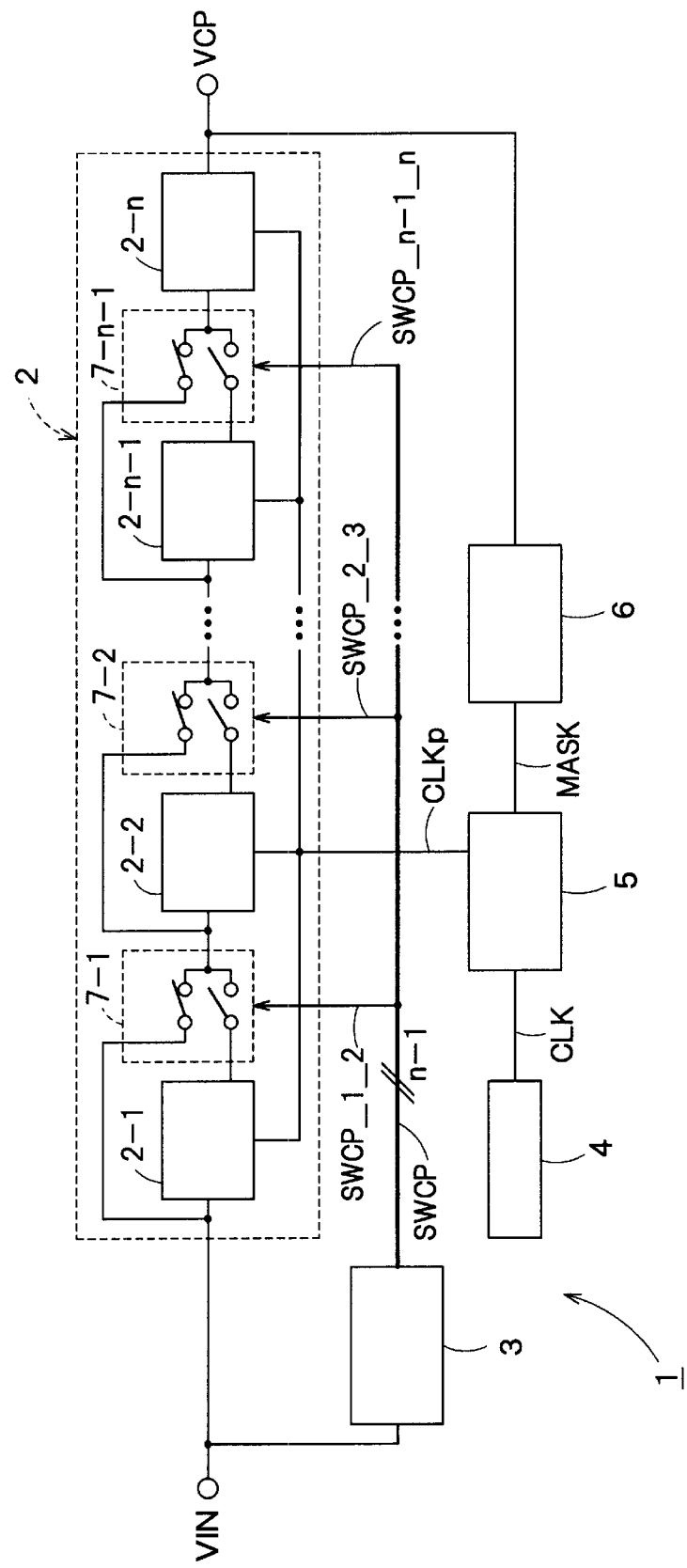
FIG. 10 is a block diagram illustrating a schematic configuration of a voltage conversion circuit according to a fourth embodiment.

FIG. 10 is a block diagram illustrating a schematic configuration of a voltage conversion circuit 1 according to the fourth embodiment. The voltage conversion circuit 1 in FIG. 10 is a voltage step-up circuit, and includes n step (n is an integer of 2 or more) voltage step-up units 2-1 to 2-n, and switchers 7-1 to 7-n−1 switching whether to perform a voltage step-up operation using each voltage step-up unit 2.

Between two adjacent voltage step-up units among the n step voltage step-up units 2-1 to 2-n, a corresponding switcher is connected. Each of the switchers 7-1 to 7-n−1 switches whether to input the output voltage of an immediately preceding voltage step-up unit 2 into a following voltage step-up unit 2 or whether to input an input voltage VIN of the immediately preceding voltage step-up unit 2 into the following voltage step-up unit 2.

The input voltage detection circuit 3 individually performs switching control of each of the switchers 7-1 to 7-n−1, that is the input voltage detection circuit 3 can switch each switcher independently. Accordingly, the input voltage detection circuit 3 may arbitrarily set whether to perform a voltage set-up operation using all voltage step-up units 2-1 to 2-n−1) in addition to the last step voltage step-up unit 2-n.

An output signal CLKp of the clock control circuit 5 is supplied to all the voltage step-up units 2-1 to 2-n. Therefore, in all the voltage step-up units 2-1 to 2-n, a clock signal is supplied only when the signal MASK is in a high level.

In this manner, in a voltage step-up circuit in FIG. 10, the n step voltage step-up units 2-1 to 2-n are provided and the input voltage detection circuit 3 controls whether to perform a voltage step-up operation using each of the voltage step-up units 2-1 to 2-n depending on a voltage level of the input voltage VIN. Therefore, the number of steps is more than in the first and the second embodiments, and consequently a voltage step-up capability may be more finely adjusted.

(Fifth Embodiment)

In a fifth embodiment to be described below, a clock signal is not supplied to voltage step-up units which are not used in a voltage step-up operation.

Figure 11:
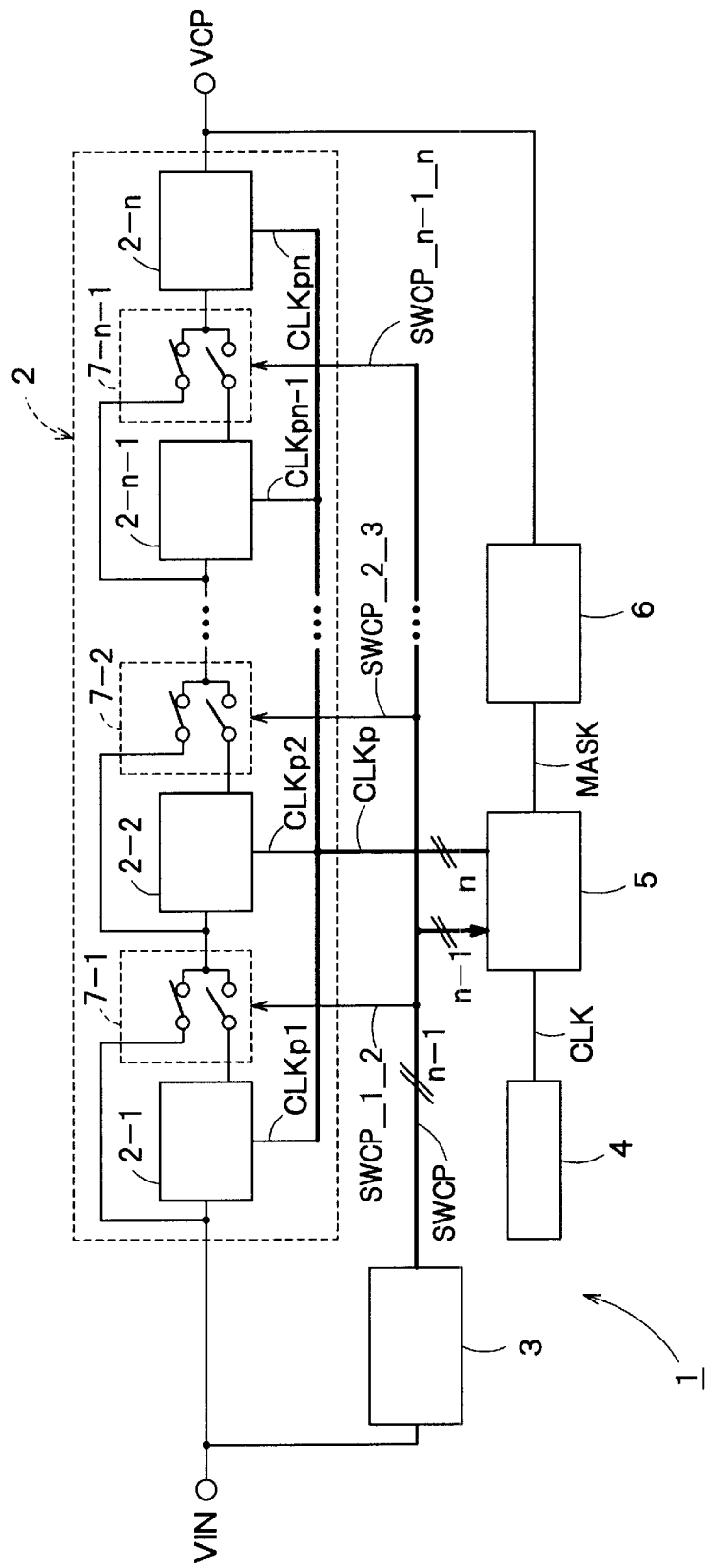
FIG. 11 is a block diagram illustrating a schematic configuration of a voltage conversion circuit according to a fifth embodiment.

FIG. 11 is a block diagram illustrating a schematic configuration of a voltage conversion circuit 1 according to a fifth embodiment. The voltage conversion circuit 1 in FIG. 11 has a different processing operation of the clock control circuit 5 from the one in FIG. 10. Not only an output signal MASK of the output voltage detection circuit 6 but also an output signal SWCP of the input voltage detection circuit 3 is input to the clock control circuit 5 in FIG. 11. Then, the clock control circuit 5 switches whether to supply a clock signal CLKp to each of the n step voltage step-up units 2-1 to 2-n based on both of signals MASK and SWCP.

In this manner, by operation of the switchers 7-1 to 7-n−1, a clock signal is not supplied to a voltage step-up unit which is not to be used in a voltage step-up operation, and the voltage step-up unit which is not used in the voltage step-up operation stops a voltage step-up operation itself. Therefore, power consumption may be reduced.

Figure 12:
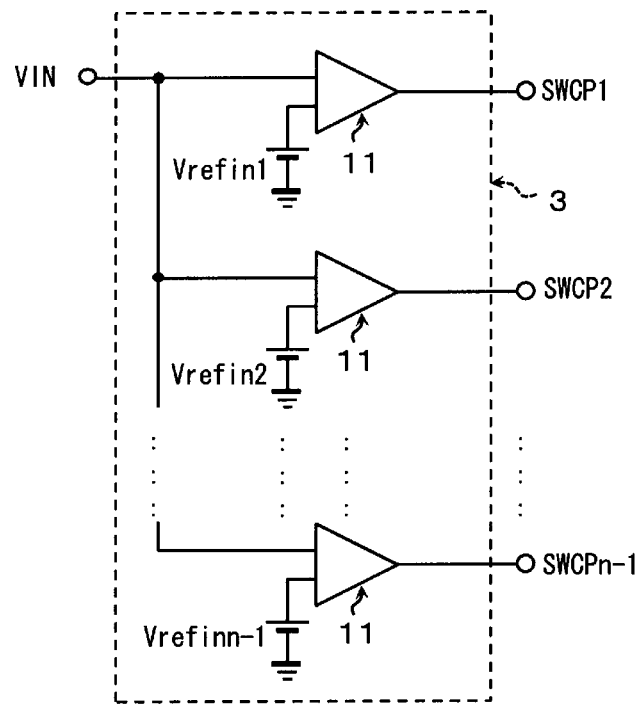
FIG. 12 is a circuit diagram of an input voltage detection circuit according to the fourth and fifth embodiments.

An example configuration of the input voltage detection circuit 3 in the fourth and fifth embodiments is depicted in FIG. 12. The input voltage detection circuit 3 in FIG. 12 is an array of the comparators 11 with a configuration illustrated in FIG. 7. There are as many comparators 11 in FIG. 12 as the number of steps in the voltage step-up unit 2-n (e.g., n, where n is an integer greater than 2). Each comparator 11 outputs a signal SWCP1 to SWCPn−1 indicating a result of comparing the input voltage VIN and a corresponding reference voltage Vrefin1 to Vrefinn−1.

Similarly, the output voltage detection circuit 6 in the fourth and fifth embodiments is also an array of the comparators 12 with a configuration illustrated in FIG. 8. There are as many comparators 12 as the number of steps of the voltage step-up units 2-n (e.g., n, where is an integer greater than 2).

Figure 13:
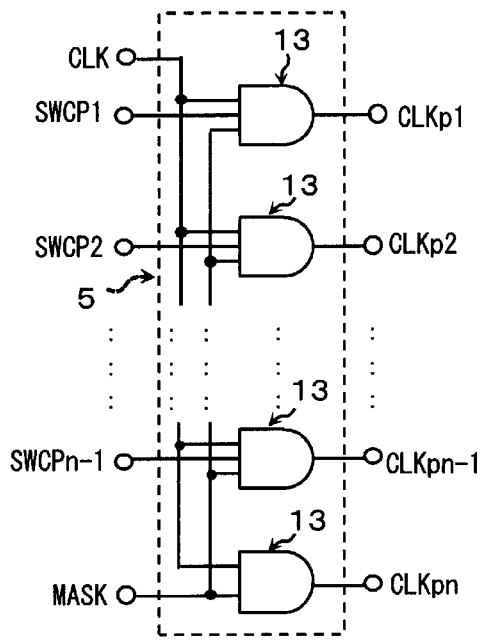
FIG. 13 is a circuit diagram of a clock control circuit according to the fifth embodiment.

In addition, the clock control circuit 5 in the fourth and fifth embodiments is configured, for example, as illustrated in FIG. 13. The clock control circuit 5 in FIG. 13 is an array of the AND gates 13 illustrated in FIG. 9. There are as many AND gates 13 as the number of steps of the voltage step-up unit 2-n (e.g., n, where is an integer greater than 2). Each AND gate 13 outputs a clock signal CLKpn according to the logical conjugation of the output from the oscillation circuit 4 (signal CLK), an output signal MASK of the output voltage detection circuit 6, and output signals SWCP1 to SWCPn−1 of the input voltage detection circuit 3.

(Sixth Embodiment)

In a sixth embodiment, a voltage step-down circuit performing a voltage step-down operation instead of the voltage step-up operation is provided.

In the first to fifth embodiments described above, a voltage step-up circuit is described as a specific example of the voltage conversion circuit 1. However, the voltage conversion circuit 1 may be a voltage step-down circuit.

Figure 14:
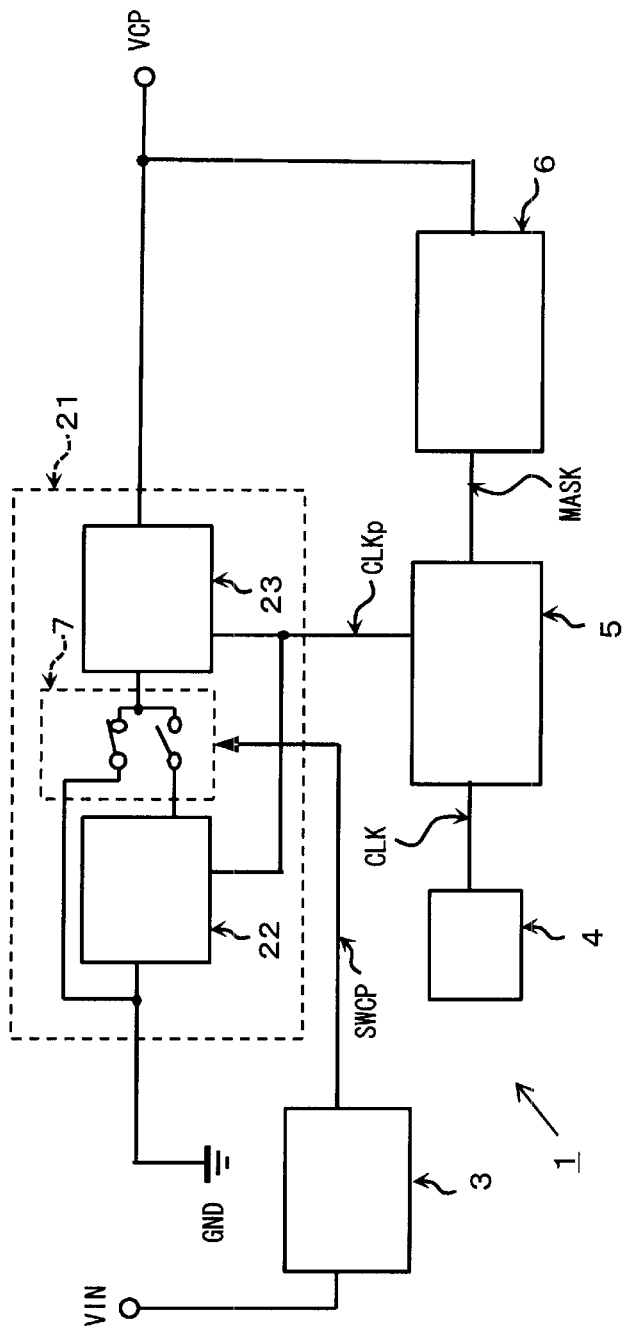
FIG. 14 is a block diagram illustrating a schematic configuration of a voltage conversion circuit according to a sixth embodiment.

FIG. 14 is a block diagram illustrating a schematic configuration of the voltage conversion circuit 1 according to the sixth embodiment. The voltage conversion circuit 1 in FIG. 14 is a voltage step-down circuit stepping down a voltage level of the input voltage VIN and outputting the result.

The voltage conversion circuit 1 in FIG. 14 has the same internal configuration as the voltage conversion circuit 1 in FIG. 1 except that the voltage step-down unit 21 is provided therein instead of the voltage step-up unit 2 in FIG. 1.

The voltage step-down unit 21 in FIG. 14 includes a first voltage step-down unit 22, a second voltage step-down unit 23, and a switcher 7. The voltage step-down unit 21 performs a voltage step-down operation using both the first voltage step-down unit 22 and the second voltage step-down unit 23 by the switching of the switcher 7, or performs the voltage step-down operation using only the second voltage step-down unit 23. More specifically, when the input voltage VIN is much higher than a predetermined reference level, which may correspond to a desired output voltage level, the voltage step-down unit 21 performs the voltage step-down operation using both the first voltage step-down unit 22 and the second voltage step-down unit 23 to quickly lower the voltage level. In addition, when there is little voltage difference between the input voltage VIN and the desired output voltage, the voltage step-down unit 21 performs the voltage step-down operation using only the second voltage step-down unit 23 so as not to lower the output voltage more than necessary.

In order to perform such control, the input voltage detection circuit 3 detects whether or not the input voltage VIN is equal to or higher than a reference voltage (a predetermined reference level). When the input voltage VIN is equal to or higher than the reference voltage, the signal SWCP is, for example, in a high level, and the switcher 7 causes both the first voltage step-down unit 22 and the second voltage step-down unit 23 to perform the voltage step-down operation on the input voltage VIN. In addition, when the input voltage VIN is lower than the reference voltage, the signal SWCP is in a low level, and the switcher 7 causes only the second voltage step-down unit 23 to perform the voltage step-down operation on the input voltage VIN.

Figure 15:
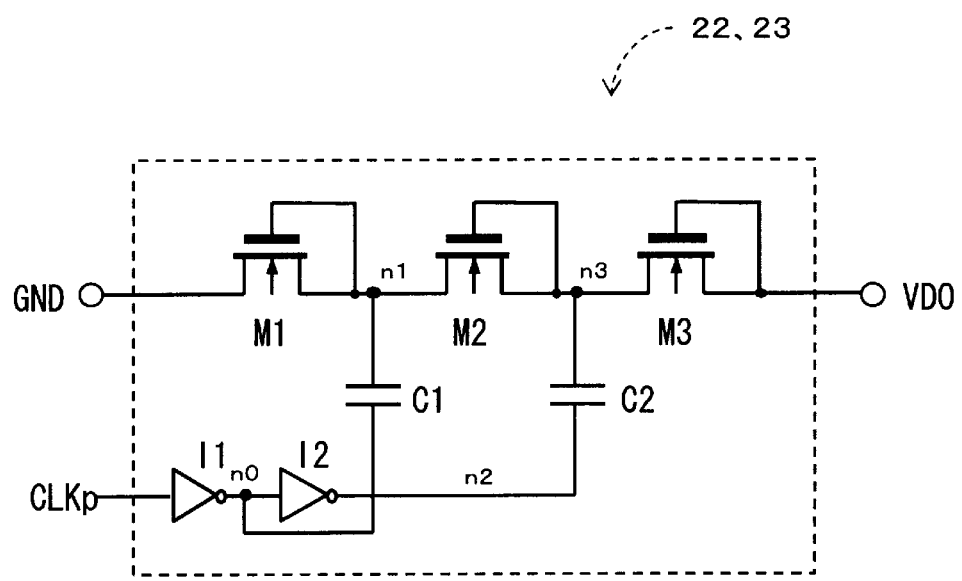
FIG. 15 is a circuit diagram illustrating an example of an internal configuration of a first voltage step-down unit and a second voltage step-down unit.

FIG. 15 is a circuit diagram illustrating an example of an internal configuration of the first voltage step-down unit 22 and the second voltage step-down unit 23. A circuit in FIG. 15 includes transistors M1 to M3 serially connected to between a ground node GND and an output node VDO, a capacitor C1 whose one end is connected to a connection node (n1) of transistors M1 and M2 such that an inversion signal of a clock signal CLK is input to the other end thereof, and a capacitor C2 whose one end is connected to a connection node (n3) of transistors M2 and M3 to enable a signal of the same logic as the clock signal CLK to be input to the other end thereof.

When the voltage of node n0 is changed from a high level to a low level, a voltage of node n1 is lowered to be a negative voltage. At this time, the node n2 is in a high level, and the capacitor C2 is charged through the transistor M2. Thereafter, when the clock signal CLK is inverted, the node n2 is in a low level, and the voltage of node n3 is also lowered to be a negative voltage. With the above operations, an output voltage VDO of the circuit in FIG. 15 is a negative voltage.

In this manner, in the sixth embodiment, the voltage step-down unit 21 is configured with the first voltage step-down unit 22, the second voltage step-down unit 23, and the switcher 7. The switcher 7, depending on a voltage level of the input voltage VIN, switches whether to perform a voltage step-down operation using both of the first voltage step-down unit 22 and the second voltage step-down unit 23 or to perform a voltage step-down operation using only the second voltage step-down unit 23. Accordingly, during a period when the input voltage VIN is significantly higher than the desired output voltage, the voltage step-down operation may be quickly performed using both the first voltage step-down unit 22 and the second voltage step-down unit 23, and when the input voltage VIN is close to the desired output voltage, the voltage step-down operation may be performed using only the second voltage step-down unit 23 while reducing electric current consumption.

The switcher 7 may switch whether to perform the voltage step-down operation using both the first voltage step-down unit 22 and the second voltage step-down unit 23, or to perform the step-down operation using only the first voltage step-down unit 22.

The voltage conversion circuit according to the above-described first to the sixth embodiments may be used in a switch control circuit switching between ON and OFF of a switching transistor (NMOS transistor or PMOS transistor).

In this case, when a voltage step-up circuit is used as the voltage conversion circuit, a switch control signal for controlling a gate of the NMOS transistor using an output voltage VCP of the voltage step-up circuit is generated by a switch control signal generation unit. In addition, when a voltage step-down circuit is used as the voltage conversion circuit, a switch control signal for controlling a gate of the PMOS transistor using the output voltage VCP of the voltage step-down circuit is generated by the switch control signal generation unit.

While certain embodiments have been described, these embodiments have been presented by way of example only, and are not intended to limit the scope of the disclosure. Indeed, the embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the disclosure.

What is claimed is:

1. A voltage conversion circuit, comprising:
   a first voltage conversion unit configured to step up or step down a first direct current (DC) voltage received at a first terminal;
   a second voltage conversion unit configured to step up or step down a second direct current (DC) voltage, the second DC voltage being one of the first DC voltage or an output voltage from the first voltage conversion unit; and
   a switcher including a first switch between the first voltage conversion unit and the second voltage conversion unit and a second switch between the first terminal and the second voltage conversion unit, the output voltage from the first voltage conversion unit being the second DC voltage when the first switch is closed and the second switch is open, and the first DC voltage being the second DC voltage when the first switch is open and the second switch is closed.

2. The voltage conversion circuit of claim 1, wherein the first and second voltage conversion units are step-up voltage circuits.

3. The voltage conversion circuit of claim 2, wherein the first and second voltage conversion units are Dickson-type step-up voltage circuits.

4. The voltage conversion circuit of claim 1, wherein the first voltage conversion unit comprises a cross-coupled type voltage step-up unit.

5. The voltage conversion circuit of claim 1, further comprising:
   an input voltage detection circuit configured to compare the first DC voltage to a predetermined reference voltage and control the switcher to switch between using one of the first and second conversion units, and using both of the first and second conversion units depending on the comparison of the first DC voltage to the predetermined reference voltage.

6. The voltage conversion circuit of claim 5, wherein the first and second voltage conversion units are step-up circuits and the input voltage detection circuit is configured to control the switcher to use both the first and second voltage conversion units when the first DC voltage level is at or below the predetermined reference voltage and to use one of the first and second voltage conversion units when the first DC voltage level is above the predetermined reference voltage.

7. The voltage conversion circuit of claim 1, further comprising:

an output voltage detection circuit configured to compare a generated output voltage generated by at least one of the first and second conversion units to a predetermined output reference voltage and to control the first and second voltage conversion units according to the comparison such that step-up processing operations of the first and second voltage conversion units cease when the generated output voltage exceeds the predetermined output reference voltage.

8. The voltage conversion circuit of claim 7, wherein the predetermined output reference voltage is a desired output voltage with a hysteresis amount added thereto.

9. The voltage conversion circuit of claim 1, further comprising:
a clock control circuit configured to supply a clock signal to the first and second voltage conversion units, wherein the first voltage conversion unit and the second voltage conversion unit perform a voltage conversion operation in synchronization with the clock signal.

10. The voltage conversion circuit of claim 9, wherein the clock signal has a high logic voltage level with a level equal to the first DC voltage.

11. A voltage conversion circuit, comprising:
a first voltage conversion unit configured to receive a direct current (DC) voltage of a first level and to output a DC voltage of a second level by stepping up or stepping down the DC voltage of the first level;
a second voltage conversion unit configured to receive a DC voltage of a third level and to output a DC voltage of a fourth level by stepping up or stepping down the DC voltage of the third level;
a switcher configured to switch between using one of the first and second voltage conversion units to generate an output voltage or using both of the first and second voltage conversion units to generate an output voltage;
an input voltage detection circuit configured to compare an input voltage level to a predetermined reference voltage level and control the switcher to switch between using one of the first conversion unit and the second conversion unit, but not the other, and using both of the first conversion unit and the second conversion unit depending on the comparison of the input voltage to the predetermined reference voltage level; and an output voltage detection circuit configured to compare the output voltage to a predetermined output reference voltage and to control the first and second voltage conversion units according to the comparison such that operations of the first and second voltage conversion units cease when the output voltage exceeds the predetermined output reference voltage.

12. The voltage conversion circuit of claim 11, further comprising:
a clock control circuit configured to supply a clock signal to the first and second voltage conversion circuits.

13. The voltage conversion circuit of claim 12, wherein the output voltage detection circuit outputs a signal to the clock control circuit that causes the clock control circuit not to supply the clock signal to the first and second voltage conversion circuits when the output voltage exceeds the predetermined output reference voltage.

14. The voltage conversion circuit of claim 12, wherein the clock control circuit is configured to supply the clock signal to the first voltage conversion unit and not the second voltage conversion unit according to a signal from the input voltage detection circuit.

15. A voltage conversion circuit, comprising:
a plurality of voltage conversion units connected in series between an input voltage terminal and an output voltage terminal, each conversion unit configured to receive a direct current (DC) voltage of a first level and to output a DC voltage of a second level by stepping up or stepping down the DC voltage of the first level;
a plurality of switchers, one switcher connected between each pair of adjacent voltage conversion units and configured to switch a connection between adjacent voltage conversion units such that a DC voltage output by a first voltage conversion unit is input to a second or third conversion unit or output to the output voltage terminal; and
an input voltage detection circuit configured to compare an input voltage level to a predetermined reference voltage level and control the each switcher of the plurality of switchers separately based on the comparison.

16. The voltage conversion circuit of claim 15, wherein the voltage conversion units are step-down voltage conversion units.

* * * * *